US012140276B2

(12) United States Patent
Van Bommel et al.

(10) Patent No.: US 12,140,276 B2
(45) Date of Patent: Nov. 12, 2024

(54) RGB ARCHITECTURE FOR COLOR CONTROLLABLE LED FILAMENT

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/267,822

(22) PCT Filed: Dec. 14, 2021

(86) PCT No.: PCT/EP2021/085603
§ 371 (c)(1),
(2) Date: Jun. 16, 2023

(87) PCT Pub. No.: WO2022/128988
PCT Pub. Date: Jun. 23, 2022

(65) Prior Publication Data

US 2024/0068627 A1 Feb. 29, 2024

(30) Foreign Application Priority Data

Dec. 17, 2020 (EP) .................................... 20214834

(51) Int. Cl.
*F21K 9/232* (2016.01)
*F21Y 103/10* (2016.01)
(Continued)

(52) U.S. Cl.
CPC ............. *F21K 9/232* (2016.08); *H05B 45/20* (2020.01); *F21Y 2103/10* (2016.08);
(Continued)

(58) Field of Classification Search
CPC ......... F21K 9/232; H05B 45/20; H01L 33/50; H01L 33/502; H01L 33/504
See application file for complete search history.

(56) References Cited

U.S. PATENT DOCUMENTS

2005/0040772 A1 2/2005 Guzman et al.
2015/0069442 A1* 3/2015 Liu ......................... F21K 9/232 257/98

(Continued)

FOREIGN PATENT DOCUMENTS

KR 20070067877 A 6/2007
WO 2020152068 A1 7/2020

*Primary Examiner* — William N Harris

(57) ABSTRACT

The invention provides a LED filament device (1000) configured to generate LED filament device light (1001), wherein the LED filament device (1000) comprises a LED filament (1100), wherein the LED filament (1100) comprises a plurality of light generating devices (100), each comprising a solid state light source (10), wherein the plurality of light generating devices (100) comprises a first set of n1 first light generating devices (110) configured to generate red first device light (111), a second set of n2 second light generating devices (120) configured to generate blue second device light (121), and a third set of n3 third light generating devices (130) configured to generate green third device light (131), wherein at least part of a total number n2 of the second light generating devices (120) of the second set are configured neighboring to first light generating devices (110) of the first set, wherein at least part of a total number n3 of the third light generating devices (130) of the third set are configured neighboring to first light generating devices (110) of the first set, wherein a total number n1 of the first light generating devices (110) is larger than the total number n2 of second light generating devices (120), wherein the total number n1 of the first light generating devices (110) is larger than a total number n3 of third light generating devices
(Continued)

(130), wherein in a first operational mode the LED filament device (1000) is configured to generate filament device light (1001) having a correlated color temperature of at maximum 2500 K, wherein the filament device light (1001) comprises the red first device light (111) of the first set of n1 first light generating devices (110), the blue second device light (121) of the second set of n2 second light generating devices (120), and the green third device light (131) of the third set of n3 third light generating devices (130).

14 Claims, 4 Drawing Sheets

(51) Int. Cl.

| | |
|---|---|
| ***F21Y 103/30*** | (2016.01) |
| ***F21Y 113/17*** | (2016.01) |
| ***F21Y 115/10*** | (2016.01) |
| ***H05B 45/20*** | (2020.01) |

(52) U.S. Cl.
CPC ....... *F21Y 2103/30* (2016.08); *F21Y 2113/17* (2016.08); *F21Y 2115/10* (2016.08)

(56) References Cited

U.S. PATENT DOCUMENTS

| | | | | |
|---|---|---|---|---|
| 2016/0265748 | A1 | 9/2016 | Abe et al. | |
| 2017/0012177 | A1* | 1/2017 | Trottier | F21K 9/00 |
| 2017/0130906 | A1* | 5/2017 | Jiang | H01L 33/62 |
| 2018/0328543 | A1 | 11/2018 | Bergmann et al. | |
| 2020/0144230 | A1* | 5/2020 | Lin | H01L 33/62 |
| 2020/0303356 | A1 | 9/2020 | Li et al. | |
| 2022/0082214 | A1* | 3/2022 | Onushkin | H05B 45/20 |
| 2022/0390073 | A1* | 12/2022 | Weijers | F21K 9/232 |

* cited by examiner

RGB ARCHITECTURE FOR COLOR CONTROLLABLE LED FILAMENT

CROSS-REFERENCE TO PRIOR APPLICATIONS

This application is the U.S. National Phase application under 35 U.S.C. § 371 of International Application No. PCT/EP2021/085603, filed on Dec. 14, 2021, which claims the benefit of European Patent Application No. 20214834.2, filed on Dec. 17, 2020. These applications are hereby incorporated by reference herein.

FIELD OF THE INVENTION

The invention relates to a device as well as to a retrofit lamp, or other lighting device, comprising such device. The invention also relates to a LED filament device for such device.

BACKGROUND OF THE INVENTION

LED filament lamps are known in the art. US2018/0328543, for instance, describes a lamp comprising an optically transmissive enclosure for emitting an emitted light; a base connected to the enclosure; at least one first LED filament and at least one second LED filament in the enclosure operable to emit light when energized through an electrical path from the base, the at least one first LED filament emitting light having a first correlated color temperature (CCT) and the at least one second LED filament emitting light having a second CCT that are combined to generate the emitted light; and a controller that changes the CCT of the emitted light when the lamp is dimmed. The optically transmissive enclosure is transparent.

WO2020152068A1 discloses a color tunable filament lamp comprising a white LED filament adapted to emit white light and an RGB LED filament. The RGB LED filament comprises a plurality of groups, each group comprising a red LED, a green LED and a blue LED.

US2020/303356A1 discloses a lamp with a LED-filament. The LED filament has a light-transmissive substrate, a first array of LED chips on a front face of the substrate, a second array of LED chips on the front face of the substrate, a first photoluminescence arrangement covering the first array of LED chips and a second photoluminescence arrangement covering the second array of LED chips. The first array of LED chips and the first arrangement generate light of a first color temperature and the second array of LED chips, and the second arrangement generate light of a second color temperature.

SUMMARY OF THE INVENTION

Incandescent lamps are rapidly being replaced by LED based lighting solutions. It may nevertheless be appreciated and desired by users to have retrofit lamps which have the look of an incandescent bulb. For this purpose, one may make use of the infrastructure for producing incandescent lamps based on glass and replace the filament with LEDs emitting white light. One of the concepts is based on LED filaments placed in such a bulb. The appearances of these lamps are highly appreciated as they look highly decorative.

Current LED filament lamps are not color controllable. For producing color controllable LED filament lamps one can make use of RGB LEDs on a (for instance translucent or transparent) substrate. However, such configuration may not provide a pleasant appearance.

Hence, it is an aspect of the invention to provide an alternative light generating device, which preferably further at least partly obviates one or more of above-described drawbacks. The present invention may have as object to overcome or ameliorate at least one of the disadvantages of the prior art, or to provide a useful alternative.

Amongst others, the invention provides in embodiments an LED filament comprising R, G and B LEDs, wherein the number of R LEDs may be larger than, such as in embodiments at least 2 times, the number of B LEDs and/or the number of G LEDs. However, other embodiments are herein also provided.

In a first aspect, the invention provides a LED filament device configured to generate filament device light. The LED filament device comprises a LED filament. Especially, the LED filament comprises a plurality of light generating devices. Even more especially, each light generating device may comprise a solid state light source. Especially, in embodiments the plurality of light generating devices may comprise a first set of n1 first light generating devices configured to generate red first device light and a second set of n2 second light generating devices configured to generate blue second device light. Further, in embodiments at least part of a total number n2 of the second light generating devices of the second set may be configured neighboring to first light generating devices of the first set. Further, in embodiments a total number n1 of the first light generating devices may be larger than the total number n2 of second light generating devices. Especially, in embodiments in a first operational mode the LED filament device is configured to generate filament device light having a correlated color temperature of at maximum 2500 K. Further, in embodiments (in the first operational mode) the filament device light may comprise the red first device light of the first set of n1 first light generating devices and the blue second device light of the second set of n2 second light generating devices (and optionally luminescent material light (see also below)). Hence, in specific embodiments the invention provides a LED filament device configured to generate filament device light, wherein the LED filament device comprises a LED filament, wherein the LED filament comprises a plurality of light generating devices, each comprising a solid state light source, wherein the plurality of light generating devices comprises a first set of n1 first light generating devices configured to generate red first device light and a second set of n2 second light generating devices configured to generate blue second device light, wherein at least part of a total number n2 of the second light generating devices of the second set are configured neighboring to first light generating devices of the first set, wherein a total number n1 of the first light generating devices is larger than the total number n2 of second light generating devices, wherein in a first operational mode the LED filament device is configured to generate filament device light having a correlated color temperature of at maximum 2500 K, wherein (in the first operational mode) the filament device light comprises the red first device light of the first set of n1 first light generating devices and the blue second device light of the second set of n2 second light generating devices.

In a second aspect, the invention provides a LED filament device configured to generate filament device light, wherein the LED filament device comprises a LED filament. Especially, the LED filament comprises a plurality of light generating devices, each comprising a solid state light source. Further, in yet further specific embodiments the plurality of light generating devices comprises a first set of n1 first light generating devices configured to generate red first device light, a second set of n2 second light generating devices configured to generate blue second device light, and a third set of n3 third light generating devices configured to generate green third device light. In specific embodiments, at least part of a total number n2 of the second light generating devices of the second set may be configured neighboring to first light generating devices of the first set. Further, in specific embodiments at least part of a total number n3 of the third light generating devices of the third set may be configured neighboring to first light generating devices of the first set. Further, especially in embodiments a total number n1 of the first light generating devices may be larger than the total number n2 of second light generating devices. Yet further, especially in embodiments the total number n1 of the first light generating devices may be larger than a total number n3 of third light generating devices. Further, in embodiments in a first operational mode the LED filament device may be configured to generate filament device light having a correlated color temperature of at maximum 2500 K. Especially, in embodiments in the first operational mode the filament device light may comprise the red first device light of the first set of n1 first light generating devices, the blue second device light of the second set of n2 second light generating devices, and the green third device light of the third set of n3 third light generating devices. Hence, in specific embodiments the invention provides a LED filament device configured to generate filament device light, wherein the LED filament device comprises a LED filament, wherein the LED filament comprises a plurality of light generating devices, each comprising a solid state light source, wherein the plurality of light generating devices comprises a first set of n1 first light generating devices configured to generate red first device light, a second set of n2 second light generating devices configured to generate blue second device light, and a third set of n3 third light generating devices configured to generate green third device light, wherein at least part of a total number n2 of the second light generating devices of the second set are configured neighboring to first light generating devices of the first set, wherein at least part of a total number n3 of the third light generating devices of the third set are configured neighboring to first light generating devices of the first set, wherein a total number n1 of the first light generating devices is larger than the total number n2 of second light generating devices, wherein the total number n1 of the first light generating devices is larger than a total number n3 of third light generating devices, wherein in a first operational mode the LED filament device is configured to generate filament device light having a correlated color temperature of at maximum 2500 K, wherein (in the first operational mode) the filament device light comprises the red first device light of the first set of n1 first light generating devices, the blue second device light of the second set of n2 second light generating devices, and the green third device light of the third set of n3 third light generating devices.

With the present invention it may be possible provide white light, which may in embodiments have a relatively low correlated color temperature (CCT). Further, with the present invention it may be possible to provide colored light. Yet, further, the color point of the light may be controllable. However, with the present invention it may be possible to control color point while also reducing a pixelated appearance. Hence, in embodiments a line like lighting device may be provided, which may provide a line of light (which may be relatively homogeneous (and which may have a relatively low or no spotty appearance)).

As indicated above, the LED filament device is especially configured to generate filament device light (during operation of the LED filament device). The filament device light is especially the light that escapes from the LED filament device during operation of the LED filament device.

The LED filament device may comprise one or more LED filaments ("filaments"). The invention will in general further be described in relation to a single filament. However, as will be clear there may be more than one filament. Hence, the LED filament device may in specific embodiments comprise a plurality of LED filaments. When there is more than one filament, these may provide during an operational mode (in embodiments) light having different optical properties or light having essentially the same optical properties.

When there is more than one LED filament, the LED filaments may not necessarily be the same. For instance, there may be two or more LED filaments having different numbers of solid state light sources. Alternatively or additionally, there may be two or more LED filaments having different shapes. Alternatively or additionally, there may be two or more LED filaments configured to generate filament light having different spectral power distributions. Alternatively or additionally, there may be two or more LED filaments having different spectral power distribution turnabilities.

Further, there may be sets of LED filaments, wherein a set comprises two or more LED filaments which may be essentially identical, such as in number of solid state light sources and in filament light spectral power distribution, wherein the LED filaments within a set do (thus) essentially not mutually differ (in terms of spectral power distribution of the filament light), whereas LED filaments from different sets may mutually differ (especially in filament light spectral power distributions).

As indicated above, in embodiments the LED filament device comprises a LED filament, wherein the LED filament comprises a plurality of light generating devices, each comprising a solid state light source ("light source").

The term "light source" may in principle relate to any light source known in the art. In a specific embodiment, the light source comprises a solid state LED light source (such as a LED or laser diode (or "diode laser")). The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light semiconductor light source may be configured on the same substrate. In embodiments, a COB is a multi LED chip configured together as a single lighting module.

The light source has a light escape surface. Referring to conventional light sources such as light bulbs or fluorescent lamps, it may be outer surface of the glass or quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes form the light exit surface of the light source.

The term "light source" may refer to a semiconductor light-emitting device, such as a light emitting diode (LEDs), a resonant cavity light emitting diode (RCLED), a vertical cavity laser diode (VCSELs), an edge emitting laser, etc. . . . . The term "light source" may also refer to an organic light-emitting diode, such as a passive-matrix (PMOLED) or an active-matrix (AMOLED). In a specific embodiment, the light source comprises a solid-state light source (such as a LED or laser diode). In an embodiment, the light source comprises a LED (light emitting diode). The terms "light source" or "solid state light source" may also refer to a superluminescent diode (SLED).

The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and (at least) part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as a LED with a luminescent material layer or dome comprising luminescent material. Such LEDs may be indicated as phosphor converted LEDs or PC LEDs. In other embodiments, the luminescent material may be configured at some distance ("remote") from the light source, such as a LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the (optional) luminescent material.

In embodiments, the light source may be selected from the group of laser diodes and superluminescent LEDs. In other embodiments, the light sources comprise LEDs.

The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation.

Especially, in embodiments the term "laser" may refer to a solid-state laser. In specific embodiments, the terms "laser" or "laser light source", or similar terms, refer to a laser diode (or diode laser).

Hence, in embodiments the light source comprises a laser light source. In embodiments, the terms "laser" or "solid state laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride (Sm:$CaF_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate Nd:$YCa_4O(BO_3)_3$ or Nd:YCOB, neodymium doped yttrium orthovanadate (Nd:$YVO_4$) laser, neodymium glass (Nd:glass) laser, neodymium YLF (Nd:YLF) solid-state laser, promethium 147 doped phosphate glass (147$Pm^{3+}$:glass) solid-state laser, ruby laser ($Al_2O_3$:$Cr^{3+}$), thulium YAG (Tm:YAG) laser, titanium sapphire (Ti:sapphire; $Al_2O_3$:$Ti^{3+}$) laser, trivalent uranium doped calcium fluoride (U:$CaF_2$) solid-state laser, Ytterbium doped glass laser (rod, plate/chip, and fiber), Ytterbium YAG (Yb:YAG) laser, $Yb_2O_3$ (glass or ceramics) laser, etc.

In embodiments, the terms "laser" or "solid state laser" may refer to one or more of a semiconductor laser diode, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light.

The laser light source is configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The filament may comprise a support and solid state light sources, supported by the support. Especially, the filament may comprise a (light transmissive) encapsulant which may at least partly enclose the solid state light source(s), especially at least enclose the light emitting surface(s) of the solid state light sources(s), such as the die(s).

The LED filament may in embodiments comprises a support, a set of solid state light sources ("light sources"), and an encapsulant. The LED filament may have a length axis having a first length (L1). Especially, the solid state light sources are arranged over the first length (L1) of the LED filament on the support. Further, the solid state light sources are configured to generate light source light (during operation of the light generating device). Especially, in embodiments the encapsulant encloses at least part of each of the solid state light sources of the set of solid state light sources. In general, the filaments may have aspect ratios of length and width, and of length and height, of at least 10, such as selected from the range of 10-10,000. The aspect ratios of different filaments may in specific embodiments differ, though in embodiments the aspect ratios may essentially be the same. Note that for a filament the aspect ratio of the length and width and the aspect ratio of the length and height may differ.

The support may in embodiments comprise one or more of (metal) leads and resin (material). In specific embodiments, the support may comprise a flexible PCB. In specific embodiments, the support may comprise a polymeric support, e.g. a polyimide support. In specific embodiments, the support may comprise a light transmissive polymeric support. The support may be flexible. In embodiments, the support may comprise a foil.

Further, in embodiments the encapsulant may comprise a luminescent material configured to convert at least part of the light source light into luminescent material light. Alternatively or additionally, one or more of the one or more solid state light sources may comprise a luminescent material, and the encapsulant may in embodiments be transparent or translucent.

Yet alternatively or additionally, the solid state light sources may be configured to generate solid state light source light without conversion material comprised by the solid state light source, i.e. the light of the solid state light source may have a spectral power distribution essentially the same as escaping from the die. Also, in such embodiments, the (optional) encapsulant may in embodiments be transparent or translucent.

Especially, the filament may be configured to generate filament light (during an operational mode of the respective filament). The filament light may comprise one or more of luminescent material light and solid state light source light (of solid state light sources without luminescent material). The luminescent material light may be from PC solid state light sources, i.e. phosphor converter solid state light sources, or from luminescent material in the encapsulant. Solid state light sources without luminescent material may herein also be indicated as non-PC solid state light sources or direct color LEDs.

As indicated above, the light generating device may comprise an LED filament, wherein the LED filament comprises a support, a set of solid state light sources, and an encapsulant.

The number of (solid state) light sources in the LED filament may be at least 8, such as at least 12, even more especially at least 24, and may e.g. be up to 100, or yet even larger. Especially, in embodiments the number of (solid state) light sources in the set may be selected from the range of 10-1000, such as 10-200.

Hence, in embodiments one or more light generating devices may each comprise a solid state light source. Alternatively or additionally, in embodiments one or more light generating devices may each comprise a solid state light source with a luminescent material, i.e. in embodiments PC LEDs.

In embodiments, the LED filament device may be based on blue light generating devices, red light generating devices, and a luminescent material that converts at least part of the blue light generated by the blue light generating devices in one or more of green and yellow light. In alternative embodiments, the LED filament device may be based on blue light generating devices, red light generating devices, and green light generating devices. In embodiments, also a combination may be applied.

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex}<\lambda_{em}$), though in specific embodiments the luminescent material may comprise up-converter luminescent material, i.e. radiation of a larger wavelength is converted into radiation with a smaller wavelength ($\lambda_{ex}>\lambda_{em}$).

In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence. The term "luminescent material" may also refer to a plurality of different luminescent materials.

In specific embodiments, the luminescent material may comprise a luminescent material of the type $A_3B_5O_{12}$:Ce, wherein A comprises one or more of Y, La, Gd, Tb and Lu, and wherein B comprises one or more of Al, Ga, In and Sc.

Hence, in embodiments the plurality of light generating devices may comprise a first set of n1 first light generating devices configured to generate red first device light and a second set of n2 second light generating devices configured to generate blue second device light.

Especially, in embodiments n1≥4, even more especially n1≥8, yet even more especially n1≥12, such as n1≥20, but much more may also be possible. Alternatively or additionally, in embodiments n2≥2, even more especially n2≥4, yet even more especially n2≥6, such as n2≥10, but much more may also be possible. Especially, the total number n1 of the first light generating devices is larger than the total number n2 of second light generating devices.

Especially, at least part of a total number n2 of the second light generating devices of the second set are configured neighboring to first light generating devices of the first set. For instance, at least 25%, even more especially at least 50%, such as in embodiments at least 75% of the total number n2 of the second light generating devices of the second set are configured neighboring to first light generating devices of the first set. Hence, in embodiments a pitch of the first light generating devices may be smaller than a pitch of the second light generating devices.

The first light generating devices, the second light generating devices, and one or more of the third light generating devices and the luminescent material (light) may in an operational mode be used to generate white (LED filament) light. Especially, this light may have a relatively low correlated color temperature, such as e.g. at maximum 2500 K, like at maximum 2400 K (see also below).

Especially, in embodiments in the first operational mode the LED filament device may be configured to generate filament device light having a correlated color temperature selected from the range of 1900-2400 K.

Hence, in embodiments in a first operational mode the LED filament device may be configured to generate filament device light having a correlated color temperature of at maximum 2500 K, wherein (in the first operational mode) the filament device light comprises the red first device light of the first set of n1 first light generating devices and the blue second device light of the second set of n2 second light generating devices.

Further, the filament device light may comprise luminescent material light. In specific embodiments, the filament device light essentially consists of the red first device light of the first set of n1 first light generating devices, the blue second device light of the second set of n2 second light generating devices, and the luminescent material light of the luminescent material.

In yet further embodiments, also described below, the device light may further comprise the red first device light of the first set of n1 first light generating devices, the blue second device light of the second set of n2 second light generating devices, and the green third device light of the third set of n3 third light generating devices. In specific embodiments, the device light may essentially consist of the red first device light of the first set of n1 first light generating devices, the blue second device light of the second set of n2 second light generating devices, and the green third device light of the third set of n3 third light generating devices.

In yet further embodiments, the device light may further comprise the red first device light of the first set of n1 first light generating devices, the blue second device light of the second set of n2 second light generating devices, and one or more of (i) the green third device light of the third set of n3 third light generating devices, and (ii) luminescent material light.

In relation to the third light generating devices, in embodiments the plurality of light generating devices may thus comprise a first set of n1 first light generating devices configured to generate red first device light, a second set of n2 second light generating devices configured to generate blue second device light, and a third set of n3 third light generating devices may be configured to generate green third device light. Further, in specific embodiments the total number n1 of the first light generating devices may be larger than a total number n3 of third light generating devices.

Especially, in embodiments at least part of a total number n3 of the third light generating devices of the third set may be configured neighboring to first light generating devices of the first set. For instance, at least 25%, even more especially at least 50%, such as in embodiments at least 75% of the total number n3 of the third light generating devices of the third set are configured neighboring to first light generating devices of the first set. Hence, in embodiments a pitch of the first light generating devices may be smaller than a pitch of the third light generating devices.

As indicated above, in specific embodiments in a first operational mode the LED filament device is configured to generate filament device light having a correlated color temperature of at maximum 2500 K, wherein (in the first operational mode) the filament device light comprises the red first device light of the first set of n1 first light generating devices, the blue second device light of the second set of n2 second light generating devices, and the green third device light of the third set of n3 third light generating devices.

As indicated above, in specific embodiments the total number n1 of the first light generating devices may be larger than the total number n2 of second light generating devices. Values of n1 smaller than about 2*n2 may lead to some pixilation effect. Especially, when n2≤1.5*n2, pixilation may occur. Hence, especially n1≥1.5*n2, yet even more especially n1≥2*n2. Values larger than 4*n2 may become less efficient, as too much space may be occupied by the first light generating devices. Especially, in embodiments 2*n2≤n1≤4*n2. In specific embodiments, 2n2≤n1≤3n2. In other specific embodiments, 3n2≤n1≤4n2. A higher n1 may provide a better (homogeneous) appearance, whereas a too high n1 may lead to less efficient solutions.

As indicated above, in specific embodiments the total number n1 of the first light generating devices may be larger than a total number n3 of third light generating devices. Values of n1 smaller than about 2*n3 may lead to some pixilation effect. Especially, when n3<1.5*n3, pixilation may occur. Hence, especially n1≥1.5*n3, yet even more especially n1≥2*n3. Values larger than 4*n3 may become less efficient, as too much space may be occupied by the first light generating devices. Especially, in embodiments 2*n3≤n1≤4*n3. In specific embodiments, 2n3≤n1≤3n3. In other specific embodiments, 3n3≤n1≤4n3. As indicated above, a higher n1 may provide a better (homogeneous) appearance, whereas a too high n1 may lead to less efficient solutions.

Hence, in embodiments one or more of the following applies: (i) 2*n2≤n1≤4*n2 and (ii) 2*n3≤n1≤4*n3. Yet further, in specific embodiments n1/(n2+n3)≥1, such as n1/(n2+n3)>1, even more especially n1/(n2+n3)≥2, applies.

Especially, in embodiments each of the first light generating devices of the first set (of n1 first light generating devices) have a shortest first mutual distance (d1), and each of the second light generating devices of the second set (of n2 second light generating devices) have a shortest second mutual distance (d2), wherein d2>d1. For instance, in embodiments d2≥1.2*d1, like in specific embodiments d2≥1.5*d1, like e.g. d2≥2*d1. In specific embodiments, d1 may be smaller than the width of three LEDs. Alternatively or additionally, in embodiments d2 may be larger dan the width of two LEDs, such as in embodiments equal to or larger than the width of three LEDs.

Alternatively or additionally, in embodiments each of the first light generating devices of the first set (of n1 first light generating devices) have a shortest first mutual distance (d1), and each of the third light generating devices of the third set (of n3 third light generating devices) have a shortest third mutual distance (d3), wherein d3>d1. For instance, in embodiments d3≥1.2*d1, like in specific embodiments d3≥1.5*d1, like e.g. d3≥2*d1. In specific embodiments, d1 may be smaller than the width of three LEDs. Alternatively or additionally, in embodiments d3 may be larger dan the width of two LEDs, such as in embodiments equal to or larger than the width of three LEDs.

Below, some specific further embodiments are described.

In embodiments, each of the first light generating devices of the first set (of n1 first light generating devices) may be configured to generate first device light having a color point with an CIE x value of at least 0.48, like at least 0.5, and a CIE y value of at maximum 0.45. Further, especially the CIE y value may be at least 0.1.5, such as at least 0.2. The CIE x value may be smaller than about 0.75, such as equal to or smaller than about 0.73. Here, the CIE values refer to the CIE 1931 color space, as known in the art.

One or more of the light generating devices may be embedded in a light transmissive material. As indicated above, the LED filament may comprise a (light transmissive) encapsulant which may at least partly enclose the solid state light source(s), especially at least enclose the light emitting surface(s) of the solid state light sources(s), such as the die(s). The encapsulant may comprise a light transmissive material. Especially, in embodiments the light transmissive material may comprise polymeric material, such as a resin. Alternative embodiments, however, may also be possible. In specific embodiments the light transmissive material may comprise a luminescent material (see also above). Alternatively or additionally, in specific embodiments the light transmissive material may comprise a light scattering material. In further specific embodiments, the light transmissive material may comprise a light transmissive host material, like a polymeric material, such as a resin, and the luminescent material. The luminescent material may be embedded in the light transmissive host material. In further specific embodiments, the light transmissive material may comprise a light transmissive host material, like a polymeric material, such as a resin, and a scattering material. The scattering material may be embedded in the light transmissive material. The scattering material may comprise light reflective particles. Instead of the term "light transmissive material" also the term "optically transmissive material" may be applied.

In embodiments, all light generating devices may be at least partly embedded in the light transmissive material. In other embodiments, a subset of the light generating devices may at least partly be embedded in the light transmissive material. Especially, the term "partly embedded" may indicated that light escaping from the light generating device can substantially only escape via the light transmissive material.

When the light transmissive material comprises scattering material, and no luminescent material, in embodiments all light generating devices may be partly embedded in the light transmissive material. When the light transmissive material comprises luminescent material, the light generating devices of which the light is at least partly converted by the luminescent material, may be partly embedded. However, also other light generating devices may be partly embedded in the light transmissive material, when the light transmissive material is substantially transmissive for the light of such other light generating devices.

In embodiments, one or more, especially all, of the first light generating devices of the first set of first light generating devices may be embedded in a light transmissive material. Alternatively or additionally, one or more, especially all, of the second light generating devices of the second set of first light generating devices may be embedded in a light transmissive material. Alternatively or additionally, one or more, especially all, of the third light generating devices of the third set of first light generating devices may be embedded in a light transmissive material.

As indicated above, in embodiments the second light generating device may also be used to generate luminescent material light. Hence, in specific embodiments one or more of the second light generating devices of the second set may be embedded in a light transmissive material.

Hence, in yet further specific embodiments, wherein the light transmissive material comprises a luminescent material configured to convert at least part of the second device light into luminescent material light, the filament device light may comprise the red first device light of the first set of n1 first light generating devices, the blue second device light of the second set of n2 second light generating devices, and the luminescent material light.

In alternative embodiments, as also indicated above, wherein the light of the light generating devices is applied, the filament device light may comprise the red first device light of the first set of n1 first light generating devices, the blue second device light of the second set of n2 second light generating devices, and the green third device light of the third set of n3 second light generating devices.

Especially, the LED filament may comprise an (elongated) array of light generating devices. This may be a 1D array or a 2D array. Especially, the term "array" is in embodiments herein used in relation to a filament having at one side light generating devices.

The filament may also have at two side light generating devices. In such embodiments, there may be two arrays. For each of the array, many of the herein described embodiments relation apply. When referring to filament light, it is referred to all light that is generated with the LED filament. Hence, when there is one array at one side, the filament light may refer to the light generated by the one array (either direction and/or indirectly via the optional luminescent material). However, when there are two arrays at both sides, the filament light may refer to the light generated by both arrays together (either direction and/or indirectly via the optional luminescent material). Especially, the invention may in embodiments be directed to LED filaments with light generating devices at one side of the filament. As indicated above, in specific embodiments a light transmissive support may be applied.

Hence, in specific embodiments the light generating devices may be configured in an elongated array comprising a single row. Hence, in such embodiments the array is a 1D array.

In other embodiments, which will also further be discussed below, the light generating devices are configured in an array comprising k rows, wherein k is selected from the range of 2-6, such as 2-4. Especially, in embodiments k=2. Would a single array be applied, k=1.

As indicated above, in embodiments the RGB principle may be applied. Hence, in specific embodiments the plurality of light generating devices comprises a third set of n3 third light generating devices configured to generate green third device light, wherein a total number n1 of the first light generating devices is larger than a total number n3 of third light generating devices, wherein in the first operational mode the filament device light comprises the red first device light of the first set of n1 first light generating devices, the blue second device light of the second set of n2 second light generating devices, and the green third device light of the third set of n3 third light generating devices.

Assuming in such RGB embodiments a single array, there may be repeating configurations of light generating devices. In specific embodiments, the light generating devices are configured in a $(R\text{-}R\text{-}G\text{-}B)_n$ or $(R\text{-}G\text{-}R\text{-}B)_n$ array, wherein R refers to the first light generating devices, B refers to the second light generating devices, and G refers to the third light generating devices, wherein n refers to the number of repetitions, wherein n≥2, even more especially n≥4. In specific embodiments, n≥5.

In specific embodiments, the light generating devices are configured in a $(R\text{-}R\text{-}X_1\text{-}X_2\text{-}B)_n$ or $(R\text{-}X_1\text{-}R\text{-}B\text{-}R\text{-}X_2)_n$ array or $(R\text{-}X_2\text{-}R\text{-}B\text{-}R\text{-}X_1)_n$, wherein R refers to the first light generating devices, B refers to the second light generating devices, and n refers to the number of repetitions, wherein n≥2, even more especially n≥4, such as at least 5. Reference $X_1$ and $X_2$ refer to the third light generating devices which may be configured to provide third device light having a color point in one of violet, cyan, green, yellow, orange, or optionally other colors. Especially, at least one of $X_1$ and $X_2$ have a color point selected from green and yellow. Further, in embodiments one of $X_1$ and $X_2$ is available. In other embodiments, $X_1$ and $X_2$ are both available. Other embodiments may also be possible.

As indicated above, in specific embodiments the light generating devices are configured in an array comprising k rows. Especially, k may be selected from the range of 2-6, such as 2-4. Especially, in embodiments k=2.

In such embodiments, there may be repeating configurations of light generating devices. However, in such embodiments the repeating configuration may include parts of k rows.

In specific embodiments, an array part of the array comprises at least four first light generating devices, at least two second light generating devices and at least two third light generating devices. Especially, in embodiments the array part may have a configuration wherein at least one of (i) the first light generating devices in the array part, (ii) the second light generating devices in the array part, and (iii) the third light generating devices in the array part, are exclusively configured in one of the arrays within the array part.

In specific embodiments, the first light generating devices are exclusively configured in one of the rows within the array part, and the second light generating devices and third light generating devices in the second row.

Hence, in specific embodiments with two rows, one of the rows may only include first light generating devices, for providing red light, and the other of the rows may include in further specific embodiments the second light generating devices for blue light and the third light generating devices for green light.

In yet further specific embodiments, with two rows, one of the rows may only include first light generating devices, for providing red light, and the other of the rows may only include in further specific embodiments the second light generating devices for blue light. Especially, in such embodiments a light transmissive material with luminescent material may be applied to convert at least part of the blue light. However, other embodiments may also be possible.

The phrase "exclusively configured in one of the rows" may indicates that that specific type of light generating devices is only available in that specific row. Even more especially, it may indicate that that specific row only includes light generating devices of that specific type.

In yet further specific embodiments, the LED filament device may comprise q1 repeating array parts, wherein each array part comprises 8 light generating devices, wherein n1=4, n2=2, n3=2, and wherein the first light generating devices in the array parts are exclusively configured in one of the rows and wherein at least part of the total number of the second light generating devices and the third light generating devices in the array part are configured in the other of the rows. Especially, q1 is at least 2, such as at least 4. Even more especially, q1 may be at least 5.

Hence, in embodiments the LED filament device may comprise at least five array parts.

In yet other embodiments, the second light generating devices may exclusively be configured in a single row, but the pitch may be larger than of the light generating devices in the other row(s). Alternatively or additionally, in embodiments wherein third light generating devices are available, the third light generating devices may exclusively be configured in a single row, but the pitch may be larger than of the light generating devices in the other row(s).

Hence, in embodiments, the first light generating devices in the array part may exclusively be configured in one of the arrays within the array part. In (other) embodiments, the second light generating devices in the array part are exclusively configured in one of the arrays within the array part. In yet (other) embodiments, the third light generating devices in the array part are exclusively configured in one of the arrays within the array part.

In specific embodiments, the light generating devices may be configured in a $[(RG)\text{-}(RB)]_n$ array or in a $[(R)\text{-}(RG)\text{-}(R)\text{-}(RB)]_n$, wherein R refers to the first light generating devices, B refers to the second light generating devices, G refers to the third light generating devices, wherein n refers to the number of repetitions, wherein (RG) refers to first light generating devices and third light generating devices in different rows, wherein (RB) refers to first light generating devices and second light generating devices in different rows. Especially, in embodiments n≥2, like n≥4, more especially n≥5. However, other color combinations are not excluded (see also above).

As there are more than two light generating devices, a control system may be used to control the light generating devices. Especially, a control system may be applied to control the first light generating devices and the second light generating devices, and the optional third light generating devices. Would further light generating devices be available, also these may be controlled by the control system.

The control system may in embodiments be functionally coupled to the LED filament device or may be comprised by the LED filament device. In specific embodiments, the LED filament device may further comprise a control system configured to control a color point of the filament device light. In specific embodiments, the LED filament device may further comprise a control system configured to control a correlated color temperature of the filament device light. Especially, in embodiments the control system may be configured to control one or more of the color point and the correlated color temperature of the filament device light by individually controlling the first set of n1 first light generating devices, the second set of n2 second light generating devices and the (optional) third set of n3 second light generating devices.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation". Likewise, in a method an action or stage, or step may be executed in a "mode" or "operation mode" or "mode of operation" or "operational mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

The control system may be used to control the filament light in operational modes in different colors or different correlated color temperatures. Different colors or different color temperatures especially imply different color points.

In specific embodiments, colors or color points of a first type of light and a second type of light may be different when the respective color points of the first type of light and the second type of light differ with at least 0.01 for u' and/or with least 0.01 for v', even more especially at least 0.02 for u' and/or with least 0.02 for v'. In yet more specific embodiments, the respective color points of first type of light and the second type of light may differ with at least 0.03 for u' and/or with least 0.03 for v'. In other specific embodiments, colors or color points of a first type of light and a second type of light may be essentially the same when the respective color points of the first type of light and the second type of light differ with at maximum 0.03 for u' and/or with least 0.03 for v', even more especially at maximum 0.02 for u' and/or with least 0.02 for v'. In yet more specific embodiments, the respective color points of first type of light and the second type of light may differ with at maximum 0.01 for u' and/or with least 0.01 for v'. Here, u' and v' are color coordinate of the light in the CIE 1976 UCS (uniform chromaticity scale) diagram.

LED filaments as such are known, and are e.g. described in U.S. Pat. No. 8,400,051 B2, WO2020016058, WO2019197394, etc. U.S. Pat. No. 8,400,051 B2, for instance, describes a light-emitting device comprising: an elongated bar-shaped package with left and right ends, the package being formed such that a plurality of leads are formed integrally with a first resin with part of the leads exposed; a light-emitting element that is fixed onto at least one of the leads and that is electrically connected to at least one of the leads; and a second resin sealing the light-emitting element, wherein the leads are formed of metal, an entire bottom surface of the light-emitting element is covered with at least one of the leads, an entire bottom surface of the package is covered with the first resin, the first resin has a side wall that is integrally formed with a portion covering the bottom surface of the package and that is higher than upper surfaces of the leads, the first resin and the second resin are formed of optically transparent resin, the second resin that is filled to a top of the side wall of the first resin and that includes a fluorescent material having a larger specific gravity than that of the second resin, the leads have outer lead portions that are used for external connection and that protrude in a longitudinal direction of the package from the left and right ends wherein the fluorescent material is arranged to concentrate near the light emitting element, and is excited by part of light emitted by the light-emitting element so as to emit a color different from a color of the light emitted by the light-emitting element, and the side wall transmits part of light that is emitted by the light-emitting element and that enters the side wall and part of light emitted from the fluorescent material to the portion covering the bottom surface of the package.

In embodiments, one or more filaments, especially all filaments, may have a substantial straight shape. In yet other embodiments, one or more filaments, especially all filaments, may have a curved shape. In yet other embodiments, one or more filaments, especially all filaments, may have a spiral shape. In yet other embodiments, one or more filaments, especially all filaments, may have a helical shape. When two or more filaments have spiral shapes or helical shapes, in embodiments two of these may have similarly configured windings. Other shaped filaments may also be possible, such as having the shape of characters, such as of letters, of numbers, of flowers, of leaves, or other shapes. Especially, in embodiments the filament(s) has (have) a spiral shape or a helical shape.

The light generating device may in general comprise a light transmissive envelope ("bulb"), such as a light transparent envelope, such as in embodiments a glass envelope. The envelope may at least partly, even more especially substantially, enclose the one or more filaments. The light transmissive envelop may have an envelope height (e.g. defined by the standard shapes B35, A60, ST63, G90, etc.). The first supporting structure may have e length of at least 20% of the height light transmissive envelope, such as in embodiments up to about 80%. Especially, the envelope is transparent for (visible) light.

The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

The terms "visible", "visible light" or "visible emission" and similar terms refer to light having one or more wavelengths in the range of about 380-780 nm. Herein, UV may especially refer to a wavelength selected from the range of 200-380 nm.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light.

The terms "violet light" or "violet emission" especially relates to light having a wavelength in the range of about 380-440 nm. The terms "blue light" or "blue emission" especially relate to light having a wavelength in the range of about 440-490 nm (including some violet and cyan hues). The terms "green light" or "green emission" especially relate to light having a wavelength in the range of about 490-560 nm. The terms "yellow light" or "yellow emission" especially relate to light having a wavelength in the range of about 560-590 nm. The terms "orange light" or "orange emission" especially relate to light having a wavelength in the range of about 590-620. The terms "red light" or "red emission" especially relate to light having a wavelength in the range of about 620-750 nm. The term "cyan" may refer to one or more wavelengths selected from the range of about 490-520 nm. The term "amber" may refer to one or more wavelengths selected from the range of about 585-605 nm, such as about 590-600 nm.

In yet a further aspect, the invention also provides a light generating device as defined herein, wherein the light generating device is a retrofit lamp. In yet a further aspect, the invention also provides a lamp or a luminaire comprising the light generating device as defined herein. The luminaire may further comprise a housing, optical elements, louvres, etc. etc. . . . . The lamp or luminaire may further comprise a housing enclosing the light generating device. The lamp or luminaire may comprise a light window in the housing or a housing opening, through which the system light may escape from the housing.

Especially, in embodiments the invention provides a lighting device, comprising the LED filament device as defined herein, wherein the lighting device is a retrofit lamp; and wherein the LED filament has a spiral shape or a helical shape.

Yet further, in embodiments the LED filament device comprises a LED filament, wherein the LED filament comprises a plurality of light generating devices, each comprising a solid state light source, wherein the plurality of light generating devices comprises a first set of n1 first light generating devices configured to generate first device light, a second set of n2 second light generating devices configured to generate second device light, and optionally a third set of n3 third light generating devices configured to generate third device light, wherein at least part of a total number n2 of the second light generating devices of the second set are configured neighboring to first light generating devices of the first set, wherein, when available, at least part of a total number n3 of the third light generating devices of the third set are configured neighboring to first light generating devices of the first set, wherein a total number n1 of the first light generating devices is larger than the total number n2 of second light generating devices, wherein the total number n1 of the first light generating devices is larger than a total number n3 of third light generating devices when the third light generating devices are available, wherein in a first operational mode the LED filament device is configured to generate filament device light having a correlated color temperature of at maximum 2500 K, wherein the filament device light comprises first device light of the first set of n1 first light generating devices, the second device light of the second set of n2 second light generating devices, and optionally third device light of the third set of n3 third light generating devices.

In specific first embodiments, the first light generating devices may be configured to generate white light having a correlated color temperature equal to or lower than 2300 K, such as equal to or lower than 2200 K. In such embodiments, the first light generating devices may generate a substantial red component.

In embodiments of the specific first embodiments, the second light generating devices may in embodiments be configured to generate cool white light, such as having a correlated color temperature of at least 2400 K, such as at least 2500 K. There may in embodiments no third light generating devices.

In other embodiments of the specific first embodiments, the second light generating devices may in embodiments be configured to generate blue second device light, which may at least partly be converted into white light by one or more of (i) a yellow luminescent material, (ii) a green luminescent material and a red luminescent material, (iii) a yellow luminescent material and a red luminescent material.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1A:
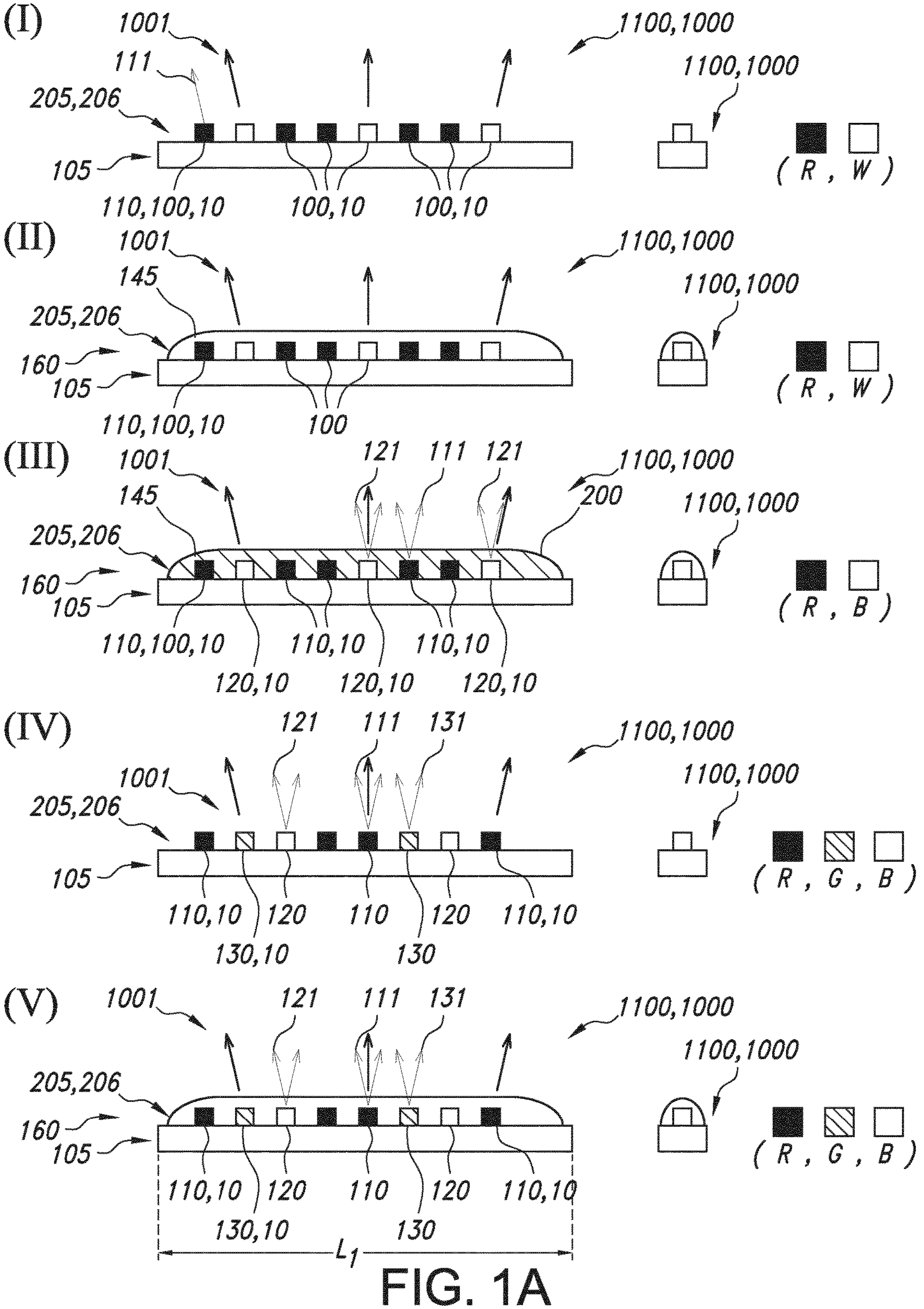
FIGS. 1*a*-1*d* schematically depict embodiments and some aspects.

FIG. 1*a* schematically depicts a number of embodiments of LED filament device 1000 configured to generate filament device light 1001. The LED filament device 1000 comprises a LED filament 1100.

The LED filament 1100 comprises a plurality of light generating devices 100, each comprising a solid state light source 10. The solid state light source may be configured to generate solid state light source light. The light generating devices are especially configured to generate device light, which may consist of one or more of solid state light source light and converted solid state light source light. The latter may especially apply when the light generating devices comprises a luminescent material, i.e. wherein the light generating device may e.g. be a PC-LED. Reference 105 refers to a support for the light generating devices. In embodiments, the support 105 may comprise a flexible PCB.

Reference L1 indicates the length of the LED filament 1100.

Especially, the plurality of light generating devices 100 comprises a first set of n1 first light generating devices 110 configured to generate red first device light 111 and a second set of n2 second light generating devices 120 configured to generate blue second device light 121. In embodiments, at least part of a total number n2 of the second light generating devices 120 of the second set are configured neighboring to first light generating devices 110 of the first set.

Further, in embodiments a total number n1 of the first light generating devices 110 is larger than the total number n2 of second light generating devices 120.

Here, schematically five embodiments are shown, with on the left side a side view or cross-sectional view parallel to the length, and on the right side a view seen from one of the ends or a cross-sectional view parallel to the width. The squares at the extreme right, with the letters below, are a legends, indicating that the black squares refer to red emitting LEDs (R), open squares refer to white light emitting LEDs (only embodiments I and II) (W), the open squares in embodiments III-VI refer to blue emitting LEDs (B), and the hatched squares refer to green emitting LEDs (G).

In embodiments I-III, n1=5 and in embodiments IV-V n1=4.

In embodiments I-II, the number of other type of light generating devices, which may in specific embodiments be indicated as second light generating devices 120, is 3. These other light generating devices may e.g. be white light generating devices, like especially PC-LEDs.

In embodiment III, the number of other type of light generating devices (which may be indicated as second light generating devices 120) is 3. Especially, in this embodiment the second light generating devices may be blue light generating devices see further below.

In embodiments IV-V, there are 2 blue light generating devices, i.e. n2=2, and two green light generating devices, i.e. n3=2.

In embodiments II and III the light generating devices 100 are embedded in an encapsulant 160. The encapsulant in embodiment II may represent an encapsulant 160 comprising light transmissive material 145 which may optionally comprise reflective particles, but which does essentially not comprise a luminescent material. The encapsulant in embodiment III may represent an encapsulant 160 comprising light transmissive material 145 which also comprises a luminescent material 200.

Embodiments I and II may be based on a white+red principle, to provide warm white LED filament light 1001. Embodiment III may be based on a RB+luminescent material to provide warm white LED filament light 1001. Embodiments IV-V may be based on RGB to provide warm white LED filament light 1001.

Hence, in a first operational mode the LED filament device 1000 may be configured to generate filament device light 1001 having a correlated color temperature of at maximum 2500 K, wherein (in the first operational mode) the filament device light 1001 comprises the red first device light 111 of the first set of n1 first light generating devices 110 and the blue second device light 121 of the second set of n2 second light generating devices 120.

Referring to e.g. embodiments IV and V, the LED filament device 1000 is configured to generate filament device light 1001. As indicated above, the LED filament device 1000 comprises a filament 1100. Especially, the filament 1100 comprises a plurality of light generating devices 100, each comprising a solid state light source 10. The plurality of light generating devices 100 comprises a first set of n1 first light generating devices 110 configured to generate red first device light 111, a second set of n2 second light generating devices 120 configured to generate blue second device light 121, and a third set of n3 third light generating devices 130 configured to generate green third device light 131. Especially, at least part of a total number n2 of the second light generating devices 120 of the second set are configured neighboring to first light generating devices 110 of the first set. Further, especially at least part of a total number n3 of the third light generating devices 130 of the third set are configured neighboring to first light generating devices 110 of the first set. Further, as indicated above, in embodiments a total number n1 of the first light generating devices 110 is larger than the total number n2 of second light generating devices 120. Yet further, as indicated above, in embodiments the total number n1 of the first light generating devices 110 is larger than a total number n3 of third light generating devices 130. Further, as indicated above in embodiments in a first operational mode the LED filament device 1000 is configured to generate filament device light 1001 having a correlated color temperature of at maximum 2500 K. Especially, in embodiments (in the first operational mode) the filament device light 1001 comprises the red first device light 111 of the first set of n1 first light generating devices 110, the blue second device light 121 of the second set of n2 second light generating devices 120, and the green third device light 131 of the third set of n3 third light generating devices 130.

Referring to embodiments I-VI, one or more of the following applies: (i) $2*n2 \leq n1 \leq 4*n2$ and (ii) $2*n3 \leq n1 \leq 4*n3$. Referring to embodiments IV and V, also $n1/(n2+n3) \geq 1$ may apply.

In embodiments, in the first operational mode the LED filament device 1000 is configured to generate filament device light 1001 having a correlated color temperature selected from the range of 1900-2400 K.

In specific embodiments, each of the first light generating devices 110 of the first set (of n1 first light generating devices 110) are configured to generate first device light 111 having a color point with an CIE x value of at least 0.48 and a CIE y value of at maximum 0.45 (and at minimum 0.35).

As indicated above, referring to embodiments II, III, and V, one or more of the second light generating devices 120 of the second set (of n2 second light generating devices 120) are embedded in a light transmissive material 145.

Referring to embodiment III, the light transmissive material 145 may comprise a luminescent material 200 configured to convert at least part of the second device light 121 into luminescent material light 201, wherein the filament device light 1001 comprises the red first device light 111 of the first set of n1 first light generating devices 110, the blue second device light 121 of the second set of n2 second light generating devices 120, and the first luminescent material light 201.

Referring to embodiments I-III, and also other embodiments described and/or schematically depicted herein, the invention may in embodiments provide a light-emitting device (herein especially indicated as LED filament device (1000)) comprising: an elongated bar-shaped package with left and right ends, the package being formed such that a plurality of leads are formed integrally with a first resin with part of the leads exposed; a light-emitting element that is fixed onto at least one of the leads and that is electrically connected to at least one of the leads; and a second resin sealing the light-emitting element, wherein the leads are formed of metal, an entire bottom surface of the light-emitting element is covered with at least one of the leads, an entire bottom surface of the package is covered with the first resin, the first resin has a side wall that is integrally formed with a portion covering the bottom surface of the package and that is higher than upper surfaces of the leads, the first resin and the second resin are formed of optically transparent resin, the second resin that is filled to a top of the side wall of the first resin and that includes a fluorescent material having a larger specific gravity than that of the second resin, the leads have outer lead portions that are used for external connection and that protrude in a longitudinal direction of the package from the left and right ends wherein the fluorescent material is arranged to concentrate near the light emitting element, and is excited by part of light emitted by the light-emitting element so as to emit a color different from a color of the light emitted by the light-emitting element, and the side wall transmits part of light that is emitted by the light-emitting element and that enters the side wall and part of light emitted from the fluorescent material to the portion covering the bottom surface of the package.

Figure 1B:
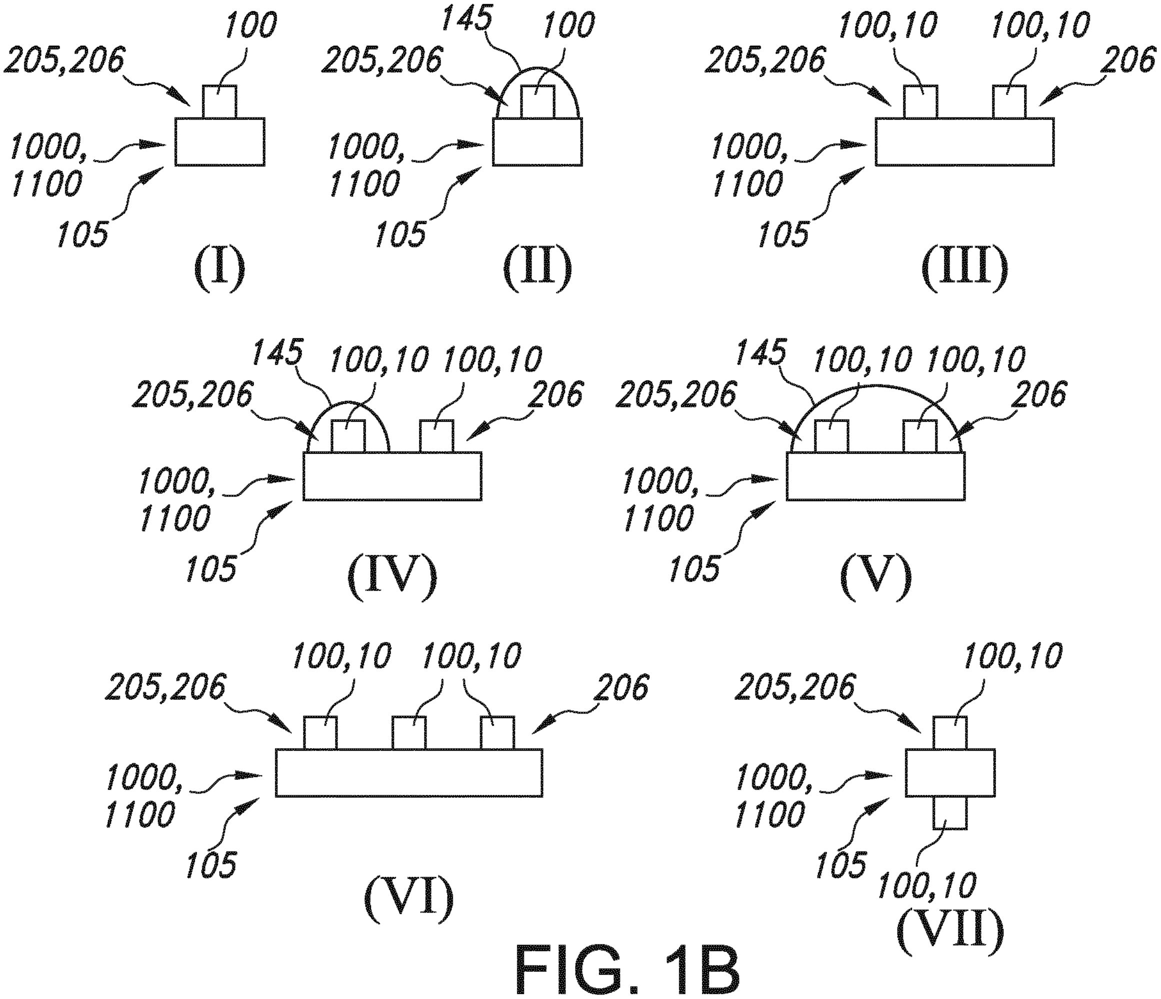

FIG. 1*b* schematically depicts a view seen from one of the ends or a cross-sectional view parallel to the width of the filament 1100. The embodiment numbers in FIG. 1*b* do not necessarily match with the embodiment number in FIG. 1*a*.

Embodiment I indicates a light generating device 100, which may e.g. be in embodiments a red LED or a blue LED or a green LED; though other embodiments may also be possible. A single row 206 is shown. Hence, an array 205 of a single row 206 is schematically depicted in embodiment I of FIG. 1*b*.

Embodiment II indicates a light generating device 100, which may e.g. be in embodiments a red LED or a blue LED or a green LED; though other embodiments may also be possible. A single row 206 is shown. Hence, an array 205 of a single row 206 is schematically depicted in embodiment II of FIG. 1*b*. The light generating device 100 is embedded in an encapsulant 160.

Embodiment III indicates two light generating devices 100, which may e.g. be in embodiments individually be selected from a red LED or a blue LED and a green LED; though other embodiments may also be possible. Two rows 206 are shown. Hence, an array 205 of two rows 206 is schematically depicted in embodiment III of FIG. 1*b*.

Embodiment IV indicates two light generating devices 100, which may e.g. be in embodiments individually be selected from a red LED or a blue LED and a green LED; though other embodiments may also be possible. Two rows 206 are shown. Hence, an array 205 of two rows 206 is schematically depicted in embodiment IV of FIG. 1*b*. One of the light generating devices 100 is embedded in an encapsulant 160. Hence, in embodiments a single row, or part thereof, may be encapsulated.

Embodiment V indicates two light generating devices 100, which may e.g. be in embodiments individually be selected from a red LED or a blue LED and a green LED; though other embodiments may also be possible. Two rows 206 are shown. Hence, an array 205 of two rows 206 is schematically depicted in embodiment IV of FIG. 1*b*. Both light generating devices 100 are embedded in an encapsulant 160. Hence, in embodiments both rows (or parts thereof) may be encapsulated.

Embodiment VI indicates three light generating devices 100, which may e.g. be in embodiments individually be selected from a red LED or a blue LED and a green LED; though other embodiments may also be possible. Three rows 206 are shown. Hence, an array 205 of three rows 206 is schematically depicted in embodiment IV of FIG. 1*b*. Of course, in specific embodiments, herein not depicted, one or more of the rows (or parts thereof) may be encapsulated.

Embodiment VII indicates an embodiment wherein at both sides of the support 105 light generating devices may be configured.

Of course, combinations of embodiments may also be possible.

Figure 1C:
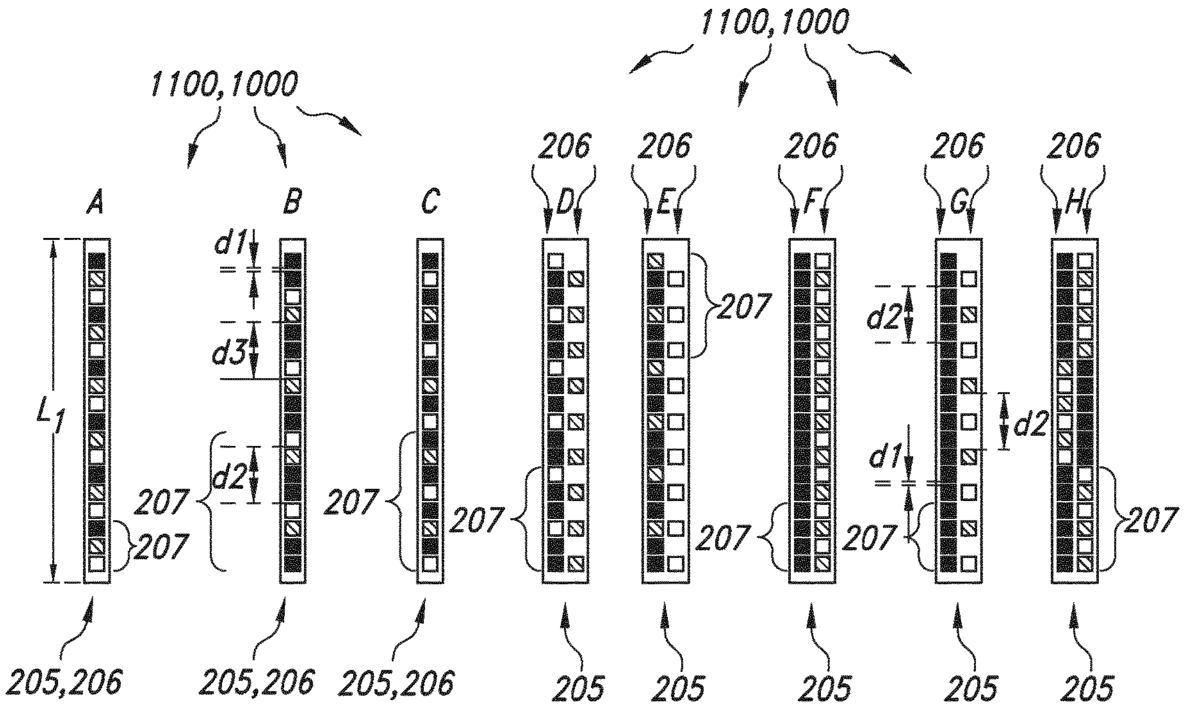

FIG. 1*c* schematically depict a number of embodiments A-H, based on the RGB principle. However, other solutions may also be possible. Here, also black squares refer to red emitting LEDs, the open squares in embodiments refer to blue emitting LEDs, and the hatched squares refer to green emitting LEDs.

In embodiments A, the embodiment does not comply with one of the conditions wherein (a) a total number n1 of the first light generating devices 110 is larger than the total number n2 of second light generating devices 120, and (b) the total number n1 of the first light generating devices 110 is larger than a total number n3 of third light generating devices 130. Embodiments B-H all comply with one or both of these conditions. Embodiment A shows a 1D array 205 $(RGB)_n$, with the top light generating device being a first light generating device (for generating red light), with n=6.

Referring to one or more of the embodiments depicted in FIG. 1*c*, embodiments are schematically depicted wherein each of the first light generating devices 110 of the first set (of n1 first light generating devices 110) have a shortest first mutual distance d1, and each of the second light generating devices 120 of the second set (of n2 second light generating devices 120) have a shortest second mutual distance d2, wherein d2>d1.

In embodiments, the plurality of light generating devices 100 comprises a third set of n3 third light generating devices 130 configured to generate green third device light 131. Especially, a total number n1 of the first light generating devices 110 is larger than a total number n3 of third light generating devices 130.

As indicated above, in the first operational mode the filament device light 1001 may comprise the red first device light 111 of the first set of n1 first light generating devices 110, the blue second device light 121 of the second set of n2 second light generating devices 120, and the green third device light 131 of the third set of n3 third light generating devices 130.

Referring to e.g. embodiments B-C in FIG. 1*c*, the light generating devices 100 are configured in an elongated array 205 comprising a single row 206. Especially, in embodiments the light generating devices are configured in a $(R\text{-}R\text{-}G\text{-}B)_n$ or $(R\text{-}G\text{-}R\text{-}B)_n$ array. Here, R refers to the first light generating devices 110, B refers to the second light generating devices 120, G refers to the third light generating devices 130, and n refers to the number of repetitions. For instance, in embodiments wherein n≥5 (note that in FIG. 1*c* smaller number of n are depicted for the sake of economy).

In embodiments, the light generating devices 100 are configured in an array 205 comprising k rows 206, wherein k=2, see e.g. embodiments D-H in FIG. 1*c*.

Referring to embodiments D-H in FIG. 1*c*, an array part 207 of the array 205 may comprise at least four first light generating devices 110, at least two second light generating devices 120 and at least two third light generating devices 130. Especially, the array part 207 may have a configuration wherein at least one of (i) the first light generating devices 110 in the array part 207, (ii) the second light generating devices 120 in the array part 207, and (iii) the third light generating devices 130 in the array part 207, are exclusively configured in one of the arrays 205 within the array part 207.

Referring to embodiments F-H in FIG. 1*c*, in embodiments the first light generating devices 110 are exclusively configured in one of the rows 206 within the array part 207, and the second light generating devices and third light generating devices in the second row.

Referring to embodiments F-H in FIG. 1*c*, the LED filament device 1000 may comprising q repeating array parts 207. In specific embodiments, each array part 207 may comprise 8 light generating devices 100, wherein n1=4, n2=2, n3=2. The first light generating devices 110 in the array parts 207 are exclusively configured in one of the rows 206 and at least part of the total number of the second light generating devices 120 and the third light generating devices 130 in the array part 207 are configured in the other of the rows 206. The value of q may be at least 5, but for the sake of economy, smaller values are depicted in embodiments F-H in FIG. 1*c*. Hence, in specific embodiments the light generating devices may be configured in a $[(RG)\text{-}(RB)]_n$ array or in a $[(R)\text{-}(RG)\text{-}(R)\text{-}(RB)]_n$, wherein R refers to the first light generating devices (110), B refers to the second light generating devices (120), G refers to the third light generating devices (130), wherein n refers to the number of repetitions, wherein (RG) refers to first light generating devices (110) and third light generating devices (130) in different rows, wherein (RB) refers to first light generating devices (110) and second light generating devices (120) in different rows. Especially, in embodiments n≥2, like n≥4, more especially n≥5.

In B, the array is an $(RRBG)_n$ 1D array, with n is at least 4, and starting with the first two light generating devices at the top being first light generating devices.

In C, the array is an $(RBRG)_n$ 1D array, with n is at least 4, and starting with the light generating device at the top being a first light generating device.

In D, the array is a 2D, with the first row a 1D array $(BRR)_n$, and the second row only green third light generating devices, but with a larger pitch. The first row starts with the top light generating device at the top being a second light generating device.

In E, the array is a 2D, with the first row a 1D array $(GRR)_n$, and the second row only blue third light generating devices, but with a larger pitch. The first row starts with the top light generating device at the top being a third light generating device.

In F, the array is a 2D, with the first row only first light generating devices, and the second row a 1D array $(BG)_n$. The second row starts with the first light generating device at the top being a second light generating device.

In G, the array is a 2D, with the first row only first light generating devices, and the second row a 1D array $(BG)_n$, however having a larger pitch. The second row starts with the first light generating device at the top being a second light generating device.

In H, the array is a 2D, with in each array part 207 one of the rows only first light generating devices, and the other of the rows a 1D array $(BG)_n$ or $(GB)_n$.

Figure 1D:
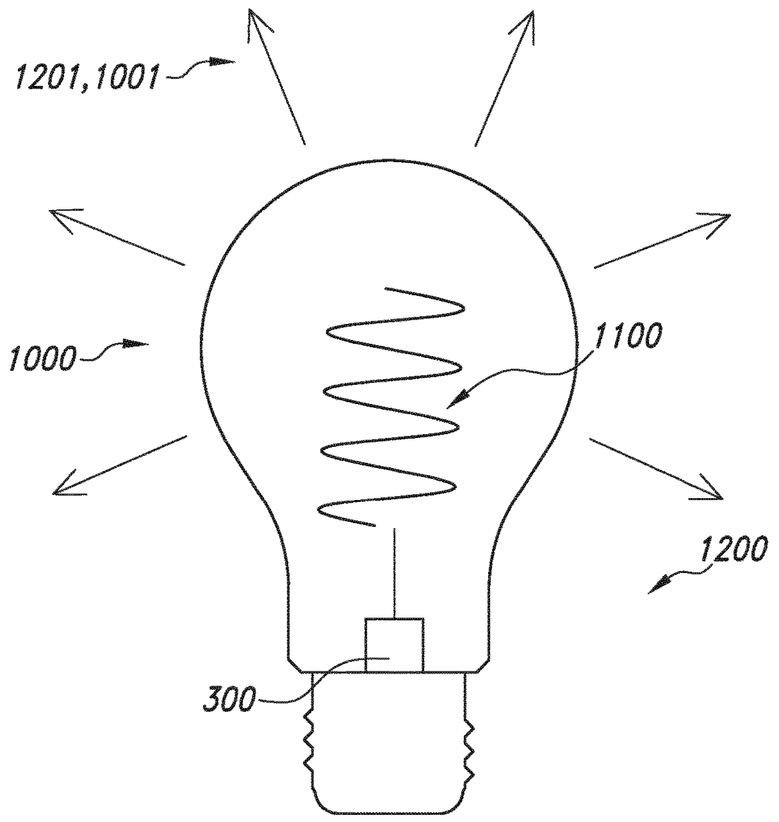

Referring to FIG. 1*d*, in embodiments the LED filament device 1000 may further comprise a control system 300 configured to control a color point of the filament device light 1001, or the control system 300 may be functionally coupled to the LED filament device 1000.

FIG. 1*d* also schematically depicts an embodiment of a lighting device 1200, comprising the LED filament device 1000. The lighting device 1200 may be a retrofit lamp. Further, an embodiment is depicted wherein the filament 1100 has a spiral shape or a helical shape.

Figure 2:
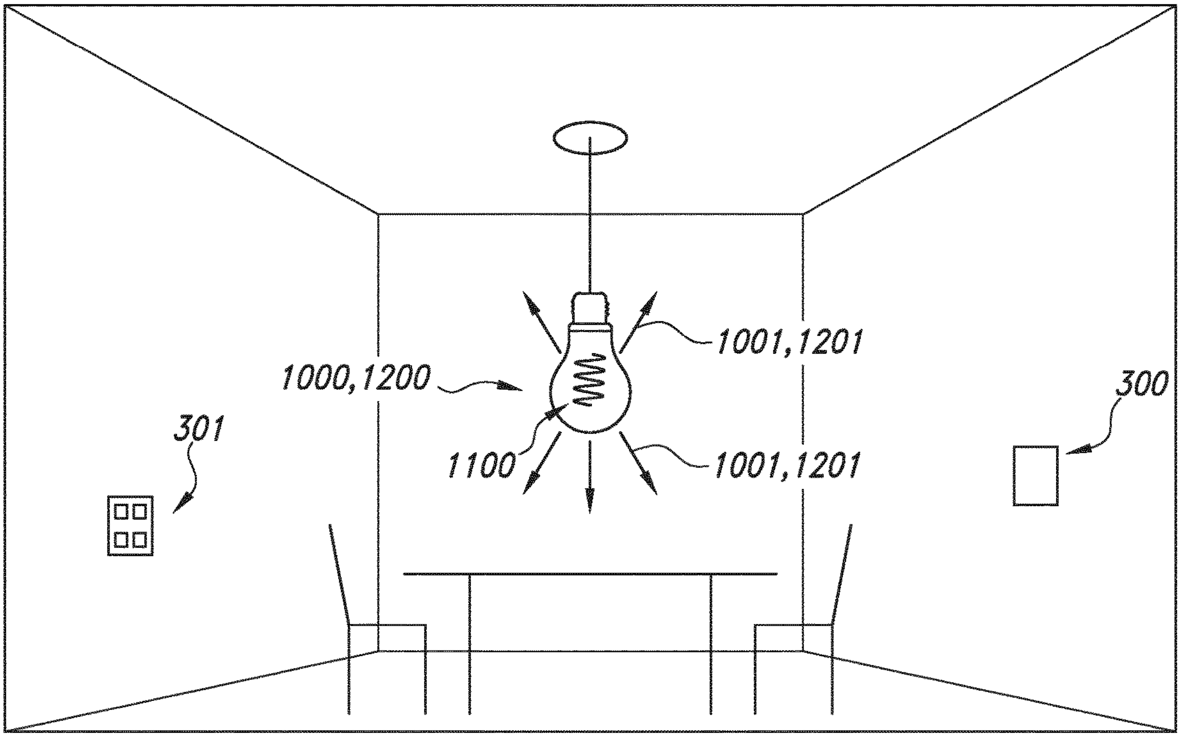
FIG. 2 also shows an embodiment. The schematic drawings are not necessarily to scale.

FIG. 2 schematically depicts an embodiment of an application of the LED filament device 1000 and/or the lighting device 1200. The lighting device light is indicated with reference 1201, which may consist of the filament device light 1001 (of one or more LED filament devices 1000). Reference 301 refers to an optional user interface and reference 300 refers to an optimal control system for controlling the light generating device(s).

The term "plurality" refers to two or more. The terms "substantially" or "essentially" herein, and similar terms, will be understood by the person skilled in the art.

The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%. The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order.

The devices, apparatus, or systems may herein amongst others be described during operation. As will be clear to the person skilled in the art, the invention is not limited to methods of operation, or devices, apparatus, or systems in operation.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A LED filament device configured to generate LED filament device light, the LED filament device comprising:

a LED filament having a plurality of light generating devices, each of the plurality of light generating devices having a solid state light source, the plurality of light generating devices having (i) a first set of n1 first light generating devices configured to generate red first device light, (ii) a second set of n2 second light generating devices configured to generate blue second device light, and (iii) a third set of n3 third light generating devices configured to generate green third device light, wherein at least part of a total number n2 of the second light generating devices of the second set are configured neighboring to first light generating devices of the first set, at least part of a total number n3 of the third light generating devices of the third set are configured neighboring to first light generating devices of the first set, a total number n1 of the first light generating devices is larger than the total number n2 of second light generating devices, and the total number n1 of the first light generating devices is larger than the total number n3 of third light generating devices, wherein in a first operational mode the LED filament device is configured to generate filament device light having a correlated color temperature of at maximum 2500 K, and the filament device light comprises the red first device light of the first set of n1 first light generating devices, the blue second device light of the second set of n2 second light generating devices, and the green third device light of the third set of n3 third light generating devices, wherein one or more of the second light generating devices of the second set of n2 second light generating devices are embedded in a light transmissive material and wherein the light transmissive material comprises a luminescent material configured to convert at least part of the second device light into luminescent material light, wherein the filament device light further comprises the luminescent material light, and wherein:

(i) the light generating devices are configured in an elongated array comprising a single row, wherein the light generating devices are configured in a $(R\text{-}R\text{-}G\text{-}B)_n$ array or a $(R\text{-}G\text{-}R\text{-}B)_n$ array, wherein R refers to the first light generating devices, B refers to the second light generating devices, and G refers to the third light generating devices, wherein n refers to a number of repetitions, wherein n≥5, or (ii) the light generating devices are configured in an array comprising k rows, wherein k is selected from a range of 2-6, and wherein an array part of the array comprises at least four first light generating devices, at least two second light generating devices and at least two third light generating devices.

2. The LED filament device according to claim 1, wherein one or more of the following applies: (i) 2*n2≤n1≤4*n2 and (ii) 2*n3≤n1≤4*n3.

3. The LED filament device according to claim 1, wherein each of the first light generating devices of the first set have a shortest first mutual distance d1, and each of the second light generating devices of the second set have a shortest second mutual distance d2, wherein d2>d1.

4. The LED filament device according to claim 1, wherein in the first operational mode the LED filament device is configured to generate filament device light having a correlated color temperature selected from a range of 1900-2400 K.

5. The LED filament device according to claim 1, wherein the light generating devices are configured in the array comprising k rows in an $[(RG)\text{-}(RB)]_n$ array or in a $[(R)\text{-}(RG)\text{-}(R)\text{-}(RB)]_n$ array, wherein n≥2.

6. The LED filament device according to claim 1, wherein the light generating devices are configured in the array comprising k rows, wherein k is 2.

7. The LED filament device according to claim 6, wherein the first light generating devices are exclusively configured in one of the rows within the array part, and wherein the second light generating devices and third light generating devices are configured in another of the rows.

8. The LED filament device according to claim 7, wherein the light transmissive material comprises a plurality of luminescent materials configured to convert at least part of the second device light into luminescent material light.

9. The LED filament device according to claim 6, wherein the LED filament device comprises at least five array parts.

10. The LED filament device according to claim 6, comprising at least five repeating array parts, wherein each array part comprises 8 light generating devices, wherein n1=4, n2=2, n3=2, and wherein the first light generating devices in the array parts are exclusively configured in one of the rows and wherein at least part of the total number of the second light generating devices and the third light generating devices in the array part are configured in the other of the rows.

11. The LED filament device according to claim 6, wherein the light generating devices are configured in a $[(RG)\text{-}(RB)]_n$ array or a $[(R)\text{-}(RG)\text{-}(R)\text{-}(RB)]_n$ array, wherein R refers to the first light generating devices, B refers to the second light generating devices, G refers to the third light generating devices, wherein n refers to the number of repetitions, wherein (RG) refers to first light generating devices and third light generating devices in different rows, wherein (RB) refers to first light generating devices and second light generating devices in different rows, and wherein n≥5.

12. The LED filament device according to claim 1, wherein the LED filament device further comprises a control system configured to control one or more of a color point and a correlated color temperature of the filament device light by individually controlling the first set of n1 first light generating devices, the second set of n2 second light generating devices and the third set of n3 second light generating devices; and wherein the LED filament has a spiral shape or a helical shape.

13. The LED filament device according to claim 12, wherein the control system is configured to control in dependence of one or more of an input signal of a user interface, a sensor signal of a sensor, and a timer.

14. A lighting device, wherein the lighting device is a retrofit lamp comprising a light transmissive envelope enclosing at least part of the LED filament device according to claim 1.

* * * * *